US010900712B2

(12) United States Patent
Dussault

(10) Patent No.: US 10,900,712 B2
(45) Date of Patent: Jan. 26, 2021

(54) BEVERAGE CHILLER EMPLOYING ARRAY OF HEAT EXCHANGE TUBES

(71) Applicant: ICECOLDNOW, INC., Braintree, MA (US)

(72) Inventor: David Dussault, Stoneham, MA (US)

(73) Assignee: ICECOLDNOW, INC., Braintree, MA (US)

(*) Notice: Subject to any disclaimer, the term of this patent is extended or adjusted under 35 U.S.C. 154(b) by 0 days.

(21) Appl. No.: 15/638,475

(22) Filed: Jun. 30, 2017

(65) Prior Publication Data

US 2017/0350645 A1    Dec. 7, 2017

Related U.S. Application Data

(63) Continuation of application No. PCT/US2015/068128, filed on Dec. 30, 2015.

(Continued)

(51) Int. Cl.
*F25D 31/00* (2006.01)
*B65D 81/18* (2006.01)
(Continued)

(52) U.S. Cl.
CPC ......... *F25D 31/003* (2013.01); *A47G 19/127* (2013.01); *A47G 19/2288* (2013.01);
(Continued)

(58) Field of Classification Search
CPC ........ F25D 31/003; F25D 3/06; F25D 31/007; F25D 2303/08222; F25D 3/08;
(Continued)

(56) References Cited

U.S. PATENT DOCUMENTS 1,954,370 A * 4/1934 Solomon ............. A47G 19/127
220/23.87
2,805,554 A * 9/1957 Schachtsiek ............ F25D 3/107
165/58

(Continued)

FOREIGN PATENT DOCUMENTS

FR           445563       11/1912
JP          54-94954       7/1979
(Continued)

OTHER PUBLICATIONS https://www.stockcap.com/extrusion-benefits.html.*
(Continued)

*Primary Examiner* — Jianying C Atkisson
*Assistant Examiner* — Jose O Class-Quinones
(74) *Attorney, Agent, or Firm* — Pierce Atwood LLP

(57) ABSTRACT

Disclosed is a beverage chiller having a bottom portion and a top portion. The bottom portion includes a perimeter wall defining a receiving vessel for receiving a beverage to be chilled. The top portion includes at least first and second cooling tubes. The bottom and top portions interfit such that the cooling tubes extend vertically down into the beverage and chill the beverage to a desired temperature by thermal contact with said cooling tubes when the top portion is positioned on the bottom portion. The first and second cooling tubes have first and second perimeters, respectively, within a horizontal cross-section of the top portion, and the first and second perimeters have substantially a same size and shape.

20 Claims, 14 Drawing Sheets

Chiller components

Related U.S. Application Data

(60) Provisional application No. 62/098,851, filed on Dec. 31, 2014.

(51) Int. Cl.
*A47G 19/22* (2006.01)
*F25D 3/08* (2006.01)
*A47G 19/12* (2006.01)
*A47J 41/00* (2006.01)
*F25D 3/06* (2006.01)
*F28D 20/02* (2006.01)
*A47G 23/04* (2006.01)

(52) U.S. Cl.
CPC ....... *A47J 41/0044* (2013.01); *A47J 41/0061* (2013.01); *B65D 81/18* (2013.01); *F25D 3/06* (2013.01); *F25D 3/08* (2013.01); *F25D 31/007* (2013.01); *A47G 23/04* (2013.01); *F25D 2303/081* (2013.01); *F25D 2303/0842* (2013.01); *F25D 2303/08222* (2013.01); *F25D 2331/81* (2013.01); *F28D 20/02* (2013.01); *F28F 2255/16* (2013.01); *F28F 2265/14* (2013.01)

(58) Field of Classification Search
CPC ............ F25D 2331/81; A47G 19/2288; A47G 19/127; A47J 41/0044
USPC ...................................................... 62/98, 400
See application file for complete search history.

(56) References Cited

U.S. PATENT DOCUMENTS

| | | | | |
|---|---|---|---|---|
| 3,359,756 A | * | 12/1967 | Mirguet | A47G 19/127 62/400 |
| 4,170,320 A | | 10/1979 | Eagar | |
| 4,531,383 A | * | 7/1985 | Zimmermann | A47J 41/0044 62/457.4 |
| 4,741,176 A | * | 5/1988 | Johnson | B65D 75/42 62/457.4 |
| 5,507,156 A | * | 4/1996 | Redmon | A47G 19/2266 220/705 |
| 5,732,567 A | * | 3/1998 | Anderson | A47G 19/2288 62/457.4 |
| 8,079,411 B2 | * | 12/2011 | Cerra | A47G 19/2288 165/185 |
| 2004/0000271 A1 | | 1/2004 | Fullerton, III | |
| 2007/0277546 A1 | | 12/2007 | Lehman | |
| 2008/0302822 A1 | * | 12/2008 | Tetreault | F25D 3/08 222/146.6 |
| 2012/0312521 A1 | * | 12/2012 | Zebuhr | F25D 3/08 165/287 |

FOREIGN PATENT DOCUMENTS

| | | |
|---|---|---|
| JP | 57-149834 | 9/1982 |
| JP | 59-25074 | 2/1984 |
| JP | 01-155832 A | 6/1989 |
| JP | 2010-070202 A | 4/2010 |
| JP | 2013-219364 A | 10/2013 |

OTHER PUBLICATIONS

JP2010070202A English machine translation (Year: 2010).*
International Search Report and Written Opinion of the International Search Authority in PCT/US15/68128 dated Feb. 25, 2016 (8 pgs.).
Supplementary European Search Report received in European application No. 15 87 6288 dated Aug. 17, 2018 (9 pgs.).
Notice of reasons for rejection received in Japanese application No. 2017-535699 dated Oct. 30, 2018 (17 pgs.).
International Preliminary Report on Patentability dated Jul. 4, 2017 in PCT/US2015/068128.
Examination Report dated Sep. 13, 2019 in Indian Patent Application No. 201717026227.

* cited by examiner

FIGURE 10A

| | | |
|---|---|---|
| delta_c | (in) | 0.280 |
| delta_w | (in) | 0.030 |
| delta_h | (in) | 0.080 |
| delta_cell | (in) | 0.420 |
| L_z | (in) | 4.75 |
| L_x | (in) | 4.20 |
| L_y | (in) | 4.20 |
| N_x | ( ) | 10.00 |
| N_y | ( ) | 10.00 |
| N | ( ) | 100.00 |
| V_h | (oz) | 16.00 |
| V_c | (oz) | 20.63 |
| V_w | (oz) | 9.79 |
| | | |
| V_pitcher | (oz) | 46.42 |
| N_x_wine | (oz) | 5.00 |
| N_y_wine | ( ) | 5.00 |
| v_wine | (oz) | 38.82 |
| v_wine | (mL) | 1,175.09 |

FIGURE 10D

BEVERAGE CHILLER EMPLOYING ARRAY OF HEAT EXCHANGE TUBES

RELATED APPLICATIONS

This application is a continuation of International Patent Application Ser. No. PCT/US2015/068128 filed Dec. 30, 2015, which claims the priority of U.S. Provisional Patent Application Ser. No. 62/098,851 filed Dec. 31, 2014, both of inventor David Dussault, which applications are hereby incorporated herein by reference in their entireties.

TECHNICAL FIELD

The present invention pertains to the field of conditioning and temperature management of a beverage, and particularly to consumer or counter top cooling device.

Many household or consumer articles and devices have been developed to address temperature control for foods and beverages. As kitchen technology evolved from ice boxes to electricity- or gas-powered refrigerators, and household refrigerators became ubiquitous, people everywhere developed tastes for cold beverages. Gas- or electrically-powered units, i.e., active refrigerators, originally intended for industrial or commercial use, were adapted for households, and then for use in vehicles. Insulated cooler chests or vessels became common for portable or mobile storage of food and beverages, thereby enabling the tastes and comforts of home to extend to camping trips, afternoon sports events and family outings. Among common constructions for thermal management of this latter type were ones involving double walls defining a container, with a vacuum space or insulation-filled space between the walls to constitute a thermos bottle or a cooler chest. While markets continued to sell ice, as they had in the days of actual 'ice box' refrigerators, the ice sold for this purpose is now sold by supermarkets, liquor stores and convenience stores, and is sold in the form of bags of crushed ice intended for picnic chests, unlike the large, solid, slow-melting blocks of earlier times. That is, crushed ice, is used in cooler chests to quickly cool food, such as cans or bottles of soda or beer. For many users, ice chests have been replaced by other, smaller containers, and the ice component has been replaced by re-usable closed polymer bags or bottles filled with a longer-lasting phase-change substance, that can be 'frozen' in a home freezer and will cool the interior space of a cooler chest or vessel for an extended time without developing meltwater.

Thus, several general technologies have been developed to deal generally with the task of achieving or maintaining a cold state for food or beverage items. These largely involve generic approaches such as providing a thermally-insulated and waterproof chest or container, and providing ice or an ice-equivalent in the chest or container to cool the food and/or beverages. Several consumer devices of cup-size (in addition to simple foam-insulated cups) have been developed for maintaining the temperature of hot coffee, or maintaining the temperature of iced coffee, as a person travels to work, or drives on the highway.

Most commonly, hot or cold beverages are first prepared, and are simply placed in a thermally-insulated cup to prevent undesired changes in temperature during the relatively short period when the beverage is consumed or carried to work. A beverage such as hot coffee has long been brewed by the pot, and typically maintained at a relatively elevated temperature until it is dispensed. Hot coffee, when purchased at a fast-food franchise or convenience store, may be sold in a styrofoam cup which prevents conductive heat loss, and have a lid to prevent evaporative cooling. Ice coffee, by contrast has typically been prepared by taking hot coffee, and chilling it—possibly for hours—before serving it. Variations, such as cold-steeped coffee may be employed to overlap the refrigeration time with the brewing time, and produce a somewhat sweeter or thicker coffee extract, which may then be diluted with cold water for ultimate use. The extract may alternatively be poured over ice, undergoing a minor amount of dilution as the ice melts, to become iced coffee of standard concentration.

In recent years coffee has moved away from being perceived as a generic beverage, and various marketing entities have promoted notions of choosing one's personal brew or flavor, and brewing an individual cup, typically brewing it in a single-serving, automated brewing machine, with an emphasis on convenience and speed as well as personal choice. When a person desires ice coffee that preserves his favorite blend or flavor, preparation may then involve directly dripping a single cup of the selected variety onto a cup of ice. Such preparation necessarily involves a certain amount of dilution as the ice melts and cools the beverage, so the companies that purvey coffee machines may provide a special darker, finer or more concentrated packet of ground coffee for preparing single-cup iced coffee in order to achieve an acceptably cool and concentrated beverage of the desired flavor.

However, one's taste in iced coffee as well as preferences regarding its method of preparation may be a matter of personal taste. These considerations, in addition to costs, could discourage many from employing or enjoying the standardized ice coffee 'single serving' melt-diluted serving units provided by manufacturers of single-cup coffee brewing appliances.

It would therefore be desirable to provide a simple to operate consumer device or conditioning vessel that constitutes a personal-sized or single-serving temperature conditioner or cooler which operates to quickly and dependably chill a serving of freshly brewed hot coffee, such as a four to six-ounce cup of hot coffee, to the temperature of iced coffee without dilution or loss of flavor. However, development of a personal coffee chiller presents a complex engineering task. One configuration of such a cooler has been proposed and described in U.S. patent application Ser. No. 13/444,438 of inventors Dussault and Zebuhr filed on Apr. 11, 2012 which issued Dec. 29, 2015 as U.S. Pat. No. 9,222,714. Briefly, the device of that patent includes top and bottom portions that are pre-chilled, and that fit together to form a closed vessel which receives a cup of hot coffee and cools it by thermal conduction. The bottom portion of the assembly has a perimeter wall that constitutes a receiving cup, and the top portion fits over and extends into the bottom portion. Each portion can be pre-chilled in a freezer, and each portion contains a number of wall- or fin-elements arranged along concentric cylinders or cylindrical segments, such that when the two portions are fitted together the fins of the upper and lower portions define a plurality of narrow fluid passages that channel and constrain the coffee poured into or placed in the vessel. The thermal contact between the fluid and the fins is intended to quickly remove heat and chill the beverage by thermal conduction. The large fin-to-fluid contact area, and the short fin-to-coffee heat transfer distance of that device, together can result in fast and effective cooling, chilling a freshly brewed cup of hot coffee down to about 35 to 40° F. in less than several minutes.

Implementation of the vessel of that patent document as a consumer product calls for a design that balances convenient size, fluid capacity, fluid cooling characteristics and aesthetic factors with the desired thermal storage and heat transfer performance; one should also, as a practical matter, consider and address any potential drawbacks or obstacles in terms of design flexibility, including the device footprint, dimensions and capacity; processes and materials of manufacture; cleanability of contacting surfaces, as well as structural, materials and performance stability of the vessel under thermal cycling. To this end applicant herein has undertaken extensive study and modeling of chiller arrangements for a personal beverage chiller, arriving at the present invention, a personal beverage chiller device of different architecture and improved construction.

SUMMARY OF THE INVENTION

The present invention is a personal size beverage chiller that receives and expeditiously chills a beverage, such as an individual portion of hot coffee, or several successive individual portions. The chiller has a housing or vessel for receiving the beverage, and a plurality of heat-exchange tubes that extend vertically down into the beverage or fluid volume to provide effective, fast and substantially uniform cooling of the intended beverage volume. The tubes have an interior that contains water or other heat exchange material, and are to be pre-chilled or frozen; the number, dimensions and spacing of the heat exchange tubes are selected and configured to quickly and effectively cool the beverage, or several successive cups of beverage. In one embodiment the vessel and cooling tube array are sized and configured to cool a cup of hot coffee down to a desired serving temperature as iced coffee, for example a temperature of 35 to 40° F. In another embodiment the vessel may be sized to receive and cool an entire pot of freshly-brewed hot coffee down to that temperature. In yet another embodiment the vessel may be configured as a wine cooler to cool a 750 mL bottle of white wine from room temperature down to an appropriate serving temperature for that beverage, for example a temperature between 40 to 50° F., or may be configured to chill cocktails or other alcoholic drinks in their characteristic batch or other corresponding volume.

The beverage chiller is implemented with a bottom portion generally forming a vessel, pitcher or cup, and a top portion comprised of the tubes arranged in an array closed at the top by a lid or cover plate so that the tubes extend vertically downward into the pitcher or cup to chill a beverage as it resides therein or is poured into the vessel. Operation and relevant thermal and dimensional characteristics of the assembly will be understood form the figures and claims herein, as well as the discussion of thermal modeling set forth below.

BRIEF DESCRIPTION OF THE FIGURES

FIGS. 10A, 10B, 10C and 10D illustrate an array and thermal and dimensional properties of a sparse embodiment suited as a wine cooler.

DETAILED DESCRIPTION

Figure 1:
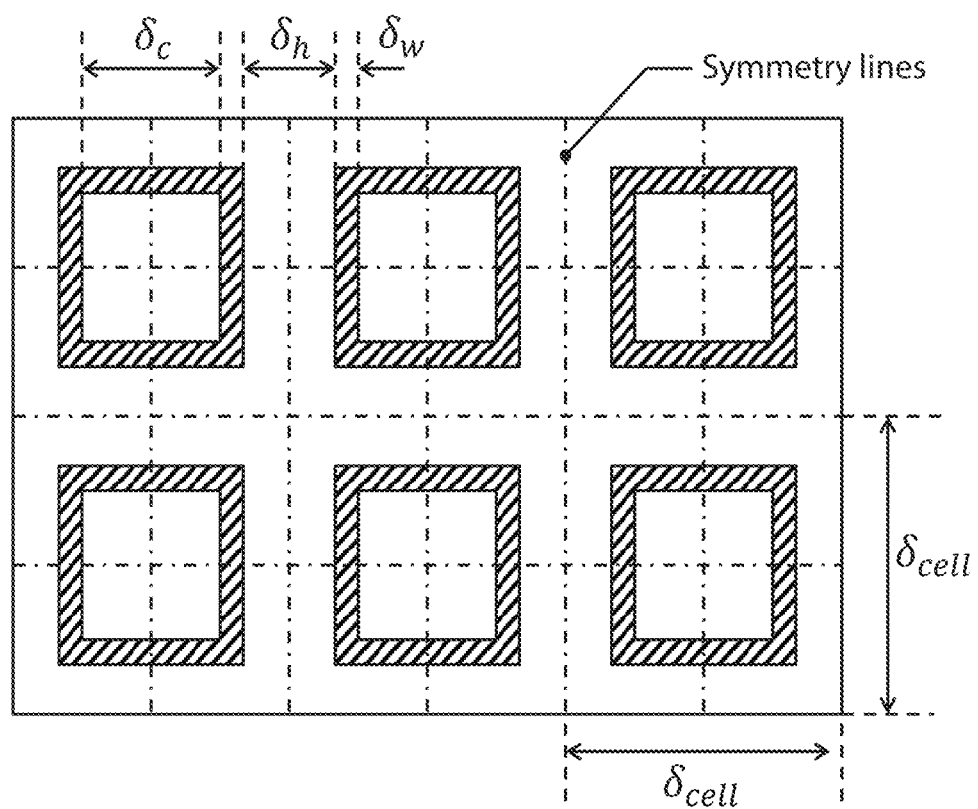
FIG. 1 schematically shows a horizontal cross section of chiller device of the present invention.

FIG. 1 schematically shows a horizontal cross section of the chiller design of the present invention, showing a heat exchanger formed by a number of square plastic tubes arranged in a regular array in the interior of a perimeter wall representing the vessel portion. The tubes are preferably extruded tubes, with wall thickness $\delta_w$ which may, for example, be about 0.020-0.040 inches. If made of stainless steel tubing rather than a polymer, the wall thickness may be considerably less due to the greater strength and thermal conductivity of metal, or the metal tubes may even be solid rods. In use, the hollow tubes are filled with a medium, such as water, and an air space is left at the top to prevent freeze stress, and the array of tubes is closed at the top by a common plate which may also serve as the cover of the bottom vessel. The tubes are vertically-disposed so the inter-tube space $\delta_h$ occupied by the hot (or warm) beverage remains uniform. An effective gap size $\delta_h$ for chilling hot coffee is 0.060-0.100 inches, a gap dimension that has been found effective to avoid icing up or closing off of free fluid circulation. Finally, the cross-dimension of tube interior space, which is to contain the ice or cold storage medium, is denominated the 'cold gap distance' $\delta_c$. In representative implementation this tube interior cross dimension may conveniently be 0.220-0.340 inches, resulting in a robust tube array construction that may be arbitrarily scale in height and number of tubes to fit the intended cup or pitcher vessel. For example a 9×10 array of tubes can be fitted in a corresponding vessel 5 inches tall, or longer tubes in a vessel 8-10 inches tall to receive a full pot of coffee.

In FIG. 1, only six squares are shown for simplicity of analysis, to identify the relevant dimensions of tubes, tube wall thickness, dimension of tube interior space which is to hold ice, and inter-tube spacing which define fluid space for chilling a beverage. In practical cup- or pitcher-sized embodiments the array will include a greater number of tubes for example a 9×10 array of tubes. The tubes are regularly spaced, and the square tube shape allows for uniform coffee spacing and form a repeating pattern of cells $\delta_{cell}$ by $\delta_{cell}$ wide, and presents parallel faces that may be brushed or otherwise cleaned relatively easily.

Figure 2:
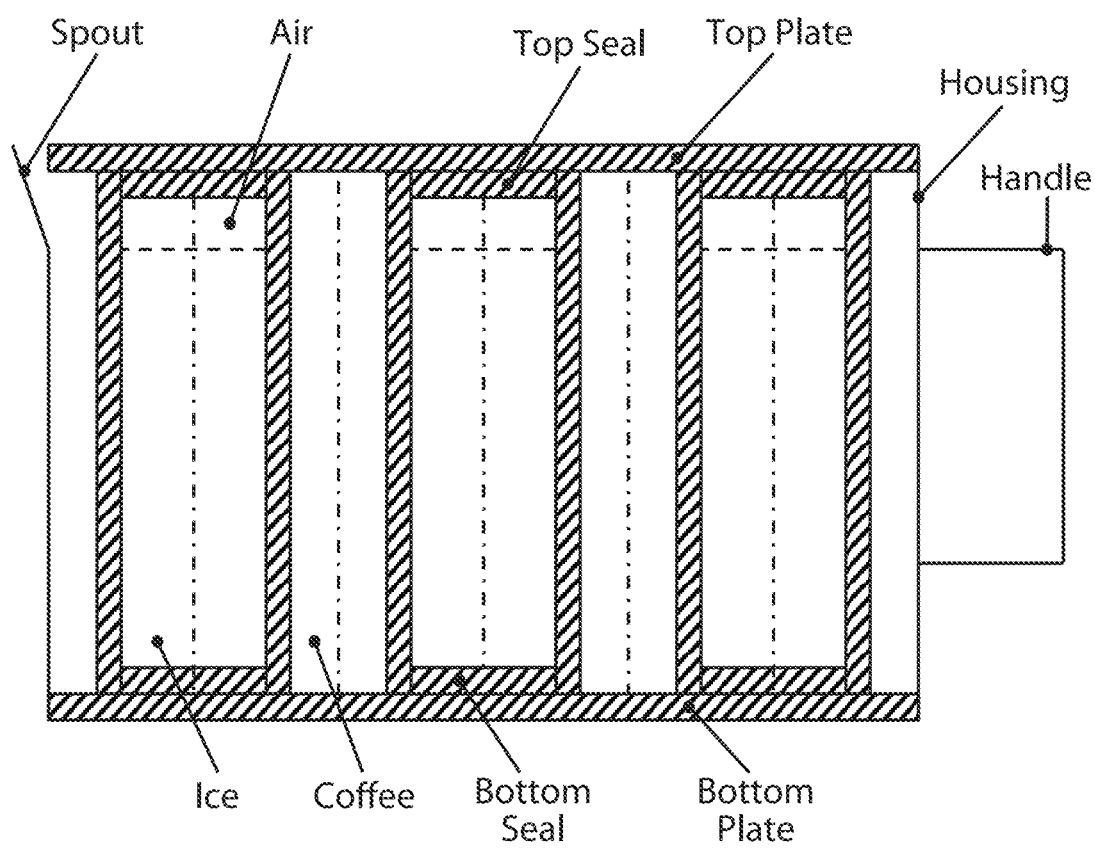
FIG. 2 shows a corresponding or representative vertical cross section.

FIG. 2 shows a representative vertical cross section. The tubes contain ice with an air gap at the top to buffer ice expansion. They are sealed at the top and bottom and are contained structurally by top and bottom plates. The housing or vessel-defining lower portion of the assembly may be formed of a suitable glass or polymer, and is preferably formed with a spout and/or fitted with a handle.

Methods of using the device generally contemplate that the heat exchanger or top portion would likely be stored in freezer separately from the housing or vessel portion. In use, a user could pour hot coffee into the housing, then place the heat exchanger onto the vessel, in steps that are similar to using a French press. Glass is one suitable material for the housing because coffee pots and French press containers are typically glass, which gives product life experience and consumer familiarity, and is well suited to the thermal stresses involved. The heat exchanger would be dimensioned or otherwise configured so that it is held or remains securely positioned in the top of the vessel when the vessel is tilted to pour out the chilled beverage. This may be assured by dimensional tolerances for a light press fitting of the top assembly or lid, into the lower vessel portion, as is conventionally done with coffee pitchers or Brita water vessels.

By use of a tube based cooling array, one is able to manufacture the tubes by extrusion using simple tooling to achieve robust and defect-free structures, and the manufacturing processes are easily changed to produce tubes of arbitrary vessel height and arrays of arbitrary number of tubes arranged in an oval, square or rectangular footprint. The ability to employ tubes of different cross-dimension relative to the fluid (hot) gap allows the same architecture and robust construction to be used for greatly different thermal tasks of chilling wine or icing hot coffee, and would even permit a common lower (vessel/pitcher) portion of the chiller device to be used with two different tube array top portions suited to the different thermal cooling speed and temperature endpoint goals of these two tasks. Moreover, the simple processes for closing the tube ends or affixing tubes to top and bottom plates to form an array, involve only heat or vibration for plastic welding, and are thus mechanically sound and food-safe, and readily adapted to chiller devices and arrays of different sizes without creating unforeseen manufacturing delays or defects. Indeed, the heat exchanger tube construction may be seen as similar in nature to manufacturing processes or mechanical structures long employed for plastic ice packs or plastic ice cubes, discrete cooler accessory items that both go through ice expansion cycles and are well recognized as food-safe and dishwasher compatible. Plastic ice cubes are also used with hot beverages and have thus been demonstrated to tolerate extreme heat cycling without defects in a long product lifetime.

Thermal Modeling was performed to extend initial modeling to two dimensions.

Figure 3:
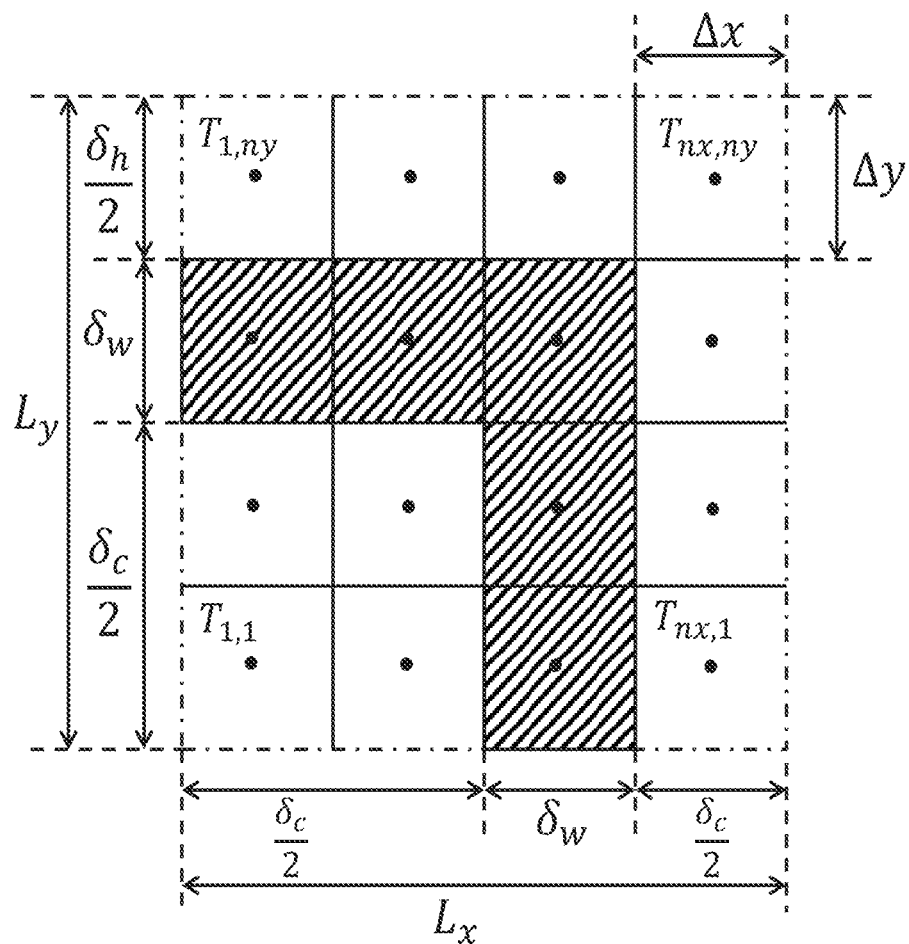
FIG. 3 shows a solution domain, taken between the symmetry lines of FIG. 1.

FIG. 3 shows the solution domain, taken between the symmetry lines of FIG. 1. The solution domain is discretized into control volumes (nx×ny) with spacing ($\Delta x \times \Delta y$). The outer bounds are $L_x$ by $L_y$. The volume constrains the depth $L_z$ into the paper (which is 4 times the total tube length due to symmetry). A relatively coarse grid is shown for simplicity, with a single cell spanning the wall.

Figure 4:
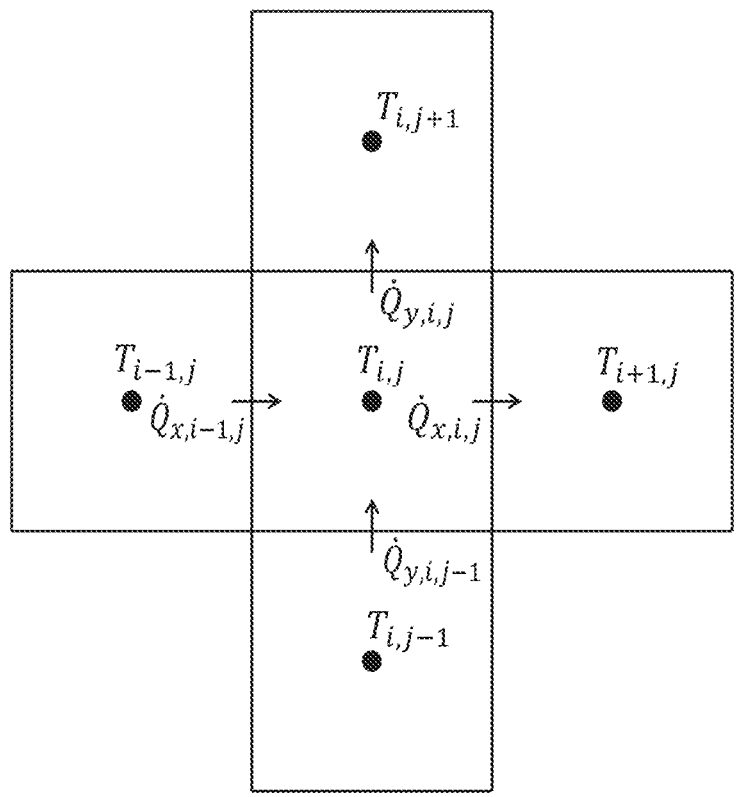
FIG. 4 shows a general control volume for temperature $T_{i,j}$ and neighboring temperatures.

FIG. 4 shows a general control volume for temperature $T_{i,j}$ with neighboring temperatures. The heat vectors are defined as $\dot{Q}_{x,i,j}$ in the x-direction and $\dot{Q}_{y,i,j}$ in the y-direction, both positive exiting the control volume.

Applying conservation of energy to the general case of sensible and latent heat gives $$\Delta m_{i,j} c_{p,i,j} \frac{dT_{i,j}}{dt} + \Delta m_{i,j} [?]_{fusion} \frac{d\beta_{i,j}}{dt} = \dot{Q}_{net}$$

where $\dot{Q}_{net}$ is the net heat transfer into control volume (i,j)

$$\dot{Q}_{net} = \dot{Q}_{x,i-1,j} + \dot{Q}_{y,i,j-1} - \dot{Q}_{x,i,j} - \dot{Q}_{y,i,j}$$

and $\beta_{i,j}$ is the phase liquid fraction $$\beta_{i,j} = \frac{\Delta m_{f,i,j}}{\Delta m_{i,j}}$$

Time is discretized using a Crank-Nicolson differencing $$\Delta m_{i,j} c_{p,i,j} \frac{(T_{i,j,m} - T_{i,j,m-1})}{\Delta t} + \Delta m_{i,j} [?] f_{us} \frac{(\beta_{i,j,m} - \beta_{i,j,m-1})}{\Delta t} = \frac{1}{2}(\dot{Q}_{net,m} + \dot{Q}_{net,m-1})$$

When the heat transfer is sensible, $(\beta_{i,j,m} - \beta_{i,j,m-1}) = 0$, and when the heat transfer is latent, $(T_{i,j,m} - T_{i,j,m-1}) = 0$. Therefore, there is one independent variable at a time, which provides numerical closure. The system of equations was solved using a (Newton-Krylov) nonlinear solver, of the form $\vec{F}(\vec{\varphi}) = 0$, where $\vec{\varphi}$ contained $T_{i,j,m}$ or $\delta_{i,j,m}$, depending on phase. Initial conditions were given, and the nonlinear solver was run once each proceeding time step.

The heat transfer accounted for variable thermal conductivity using a local piece-wise linear approximation. For the x-direction $$\dot{Q}_{x,i,j,m} = \frac{T_{i,j,m} - T_{i+1,j,m}}{\left(\frac{\Delta x}{2k_{i,j,m} \Delta y L_z}\right) + \left(\frac{\Delta x}{2k_{i+1,j,m} \Delta y L_z}\right)}$$

For the y-direction $$\dot{Q}_{y,i,j,m} = \frac{T_{i,j,m} - T_{i,j+1,m}}{\left(\frac{\Delta y}{2k_{i,j,m} \Delta x L_z}\right) + \left(\frac{\Delta y}{2k_{i,j+1,m} \Delta x L_z}\right)}$$

Space averaging was used to show the mixed temperature time response. For instance, for the coffee temperature $$T_{h,m} = \frac{\Sigma_{hot} T_{i,j,m} \Delta x \Delta y L_z}{\Sigma_{hot} \Delta x \Delta y L_z}$$

where the sum is implied to be taken over the hot section.

Structural Analysis

Consider a single tube. As the water freezes, it expands into the wall, which deflects, and into the air, which compresses. The edges of the square tube (in a cross section view) are modeled as rigid. The flat sides deflect under the pressure of ice expansion. Let the edges conservatively act as pin boundary conditions; i.e. fixed in position but not in slope.

Let the initial unfrozen condition be state 1, completely given, including air length $L_{\alpha 1}$, liquid length $L_{f1}$, pressure $P_1$, and temperature $T_1$. Let the final frozen condition be state 2. The givens include temperature $T_2$, a constant tube length $L_{tube}$, and "liquid" volume $V_{f2}$ via ice expansion. (Note that the density of ice is essentially independent of pressure.) State 2 has 3 degrees of freedom, the pressure $P_2$, the wall deflection $y_{avg,2}$, and the air length $L_{\alpha 2}$, and therefore requires 3 constraints.

The first constraint is the wall deflection, given by [2], using beam notation $$y(x) = \frac{-w}{24 EI}(2Lx^3 - x^4 - L^3 x) => y(x) = \frac{-P}{2E[?]^3}(2Lx^3 - x^4 - L^3 x)$$

Switching to Heat Exchanger Notation $$y(x) = \frac{-P_g}{2E\delta_w^3}(2\delta_c x^3 - x^4 - \delta_c^3 x)$$

Note that gauge pressure is used. The average displacement is given by integrating the displacement $$y_{avg,2} = \left(\frac{1}{\delta_c}\right)\int_0^{\delta_c} \frac{-P_{g2}}{2E\delta_w^3}(2\delta_c x^3 - x^4 - \delta_c^3 x)dx = > y_{avg,2} = \frac{P_{g2}\delta_c^4}{10E\delta_w^3}$$

The second constraint is conservation of volume $$V_2 = V_{a2} + V_{f2} = > \left(1 + \frac{\Delta V}{V_1}\right) = \left(\frac{V_{a2}}{V_1}\right) + \left(\frac{V_{f1}}{V_1}\right)\left(1 + \frac{\Delta V_f}{V_{f1}}\right)$$

The third constraint is the ideal gas equation $$\left(\frac{P_2}{P_1}\right)\left(\frac{V_{a2}}{V_{a1}}\right) = \left(\frac{T_2}{T_1}\right) = > V_{a2} = V_{a1}\left(\frac{T_2}{T_1}\right)\left(\frac{P_1}{P_2}\right)$$

The above three equations were solved analytically for $P_2$.

Returning to the beam equations, the point of maximum stress is the surface of the mid-point in the x-direction. First, using beam notation $$\sigma = \frac{Mc}{I} = \frac{\left(\frac{PbL^2}{8}\right)\left(\frac{b}{2}\right)}{\left(\frac{b^3}{12}\right)} = \frac{3PL^2}{4b^2}$$

Switching to Heat Exchanger Notation $$\sigma = \frac{3}{4}P_{g2}\left(\frac{\delta_c}{\delta_w}\right)^2$$

Thermal Results:

The thermal model was run preliminarily to establish a cell spacing within which optimization could be found, and a value of $\delta_{cell}$=0.5 in was established. This constrains the integer number of tubes to fit within a standard or desired housing size.

Figure 5:
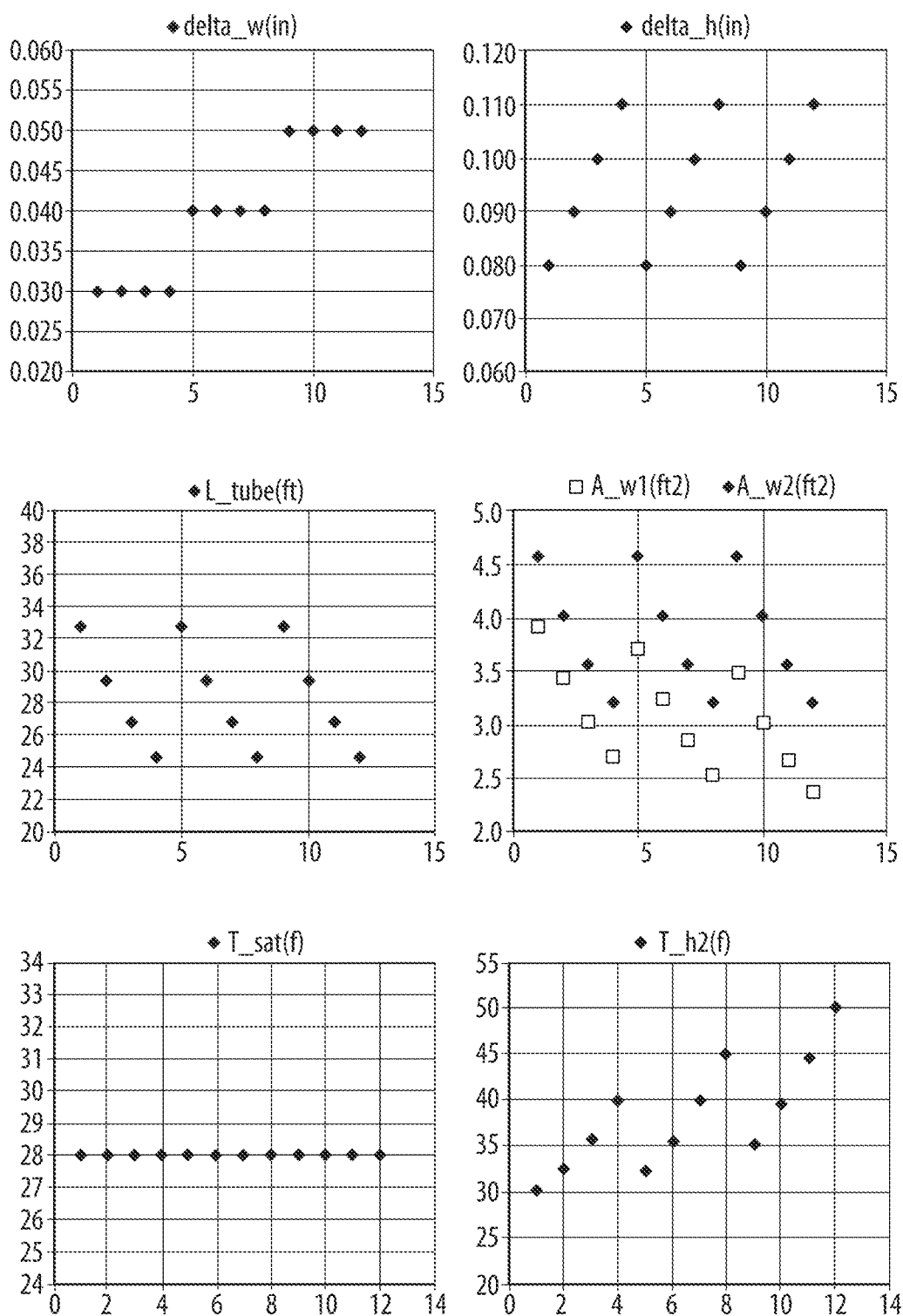
FIG. 5 shows the thermal results using a design of experiments (DOE) method.

FIG. 5 shows the thermal results using a design of experiments (DOE) method. DOE inputs are wall thickness, coffee gap, and saturation temperature. Outputs are total tube length, inner and outer wall surface area, and final (space averaged) coffee temperature after two minutes. Constant model inputs for the coffee chiller embodiment include a coffee temperature of 190° F., a freezer temperature of 0° F., and a coffee volume of 16 oz. The final temperature increases as the wall thickness increases and also increases as the coffee gap increases. The final temperature for this application should be less than 40° F. A larger wall thickness is desired for sealing purposes as well as for stress (below). Conversely, a lower wall thickness is desired for heat transfer. At a wall thickness of 0.040 in and a coffee gap of 0.090 in, the final temperature is 36° F. This gives design margin for increasing wall thickness farther for stress/seal or for decreasing the coffee gap for additional heat transfer.

Figure 6:
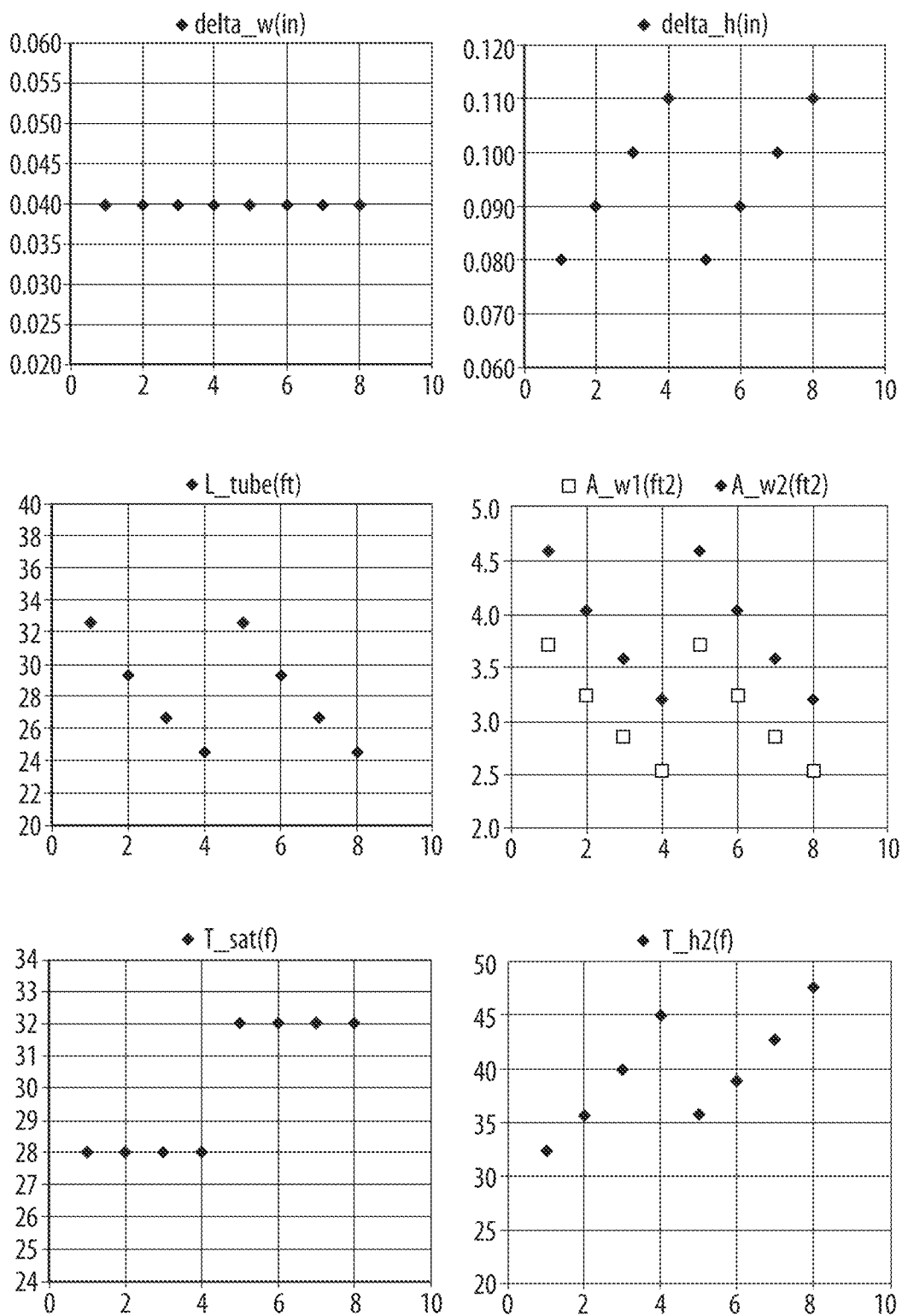
FIG. 6 shows the results for one wall thickness, with a saturation temperature sensitivity.

FIG. 6 shows the results for a wall thickness of 0.040 in and includes a saturation temperature sensitivity. The saturation temperature is controlled with salt. 28° F. corresponds to 35,000 ppm, the concentration of ocean water. Salt is not strictly required to meet the cooling spec, but a factor of safety for performance. It also provides a structural benefit. At the design point, the total tube length (90 4-inch tubes) is about or slightly under 30 feet. The wall/ice and wall/coffee surface areas are roughly 3.25 and 4 square feet, respectively.

Figure 7:
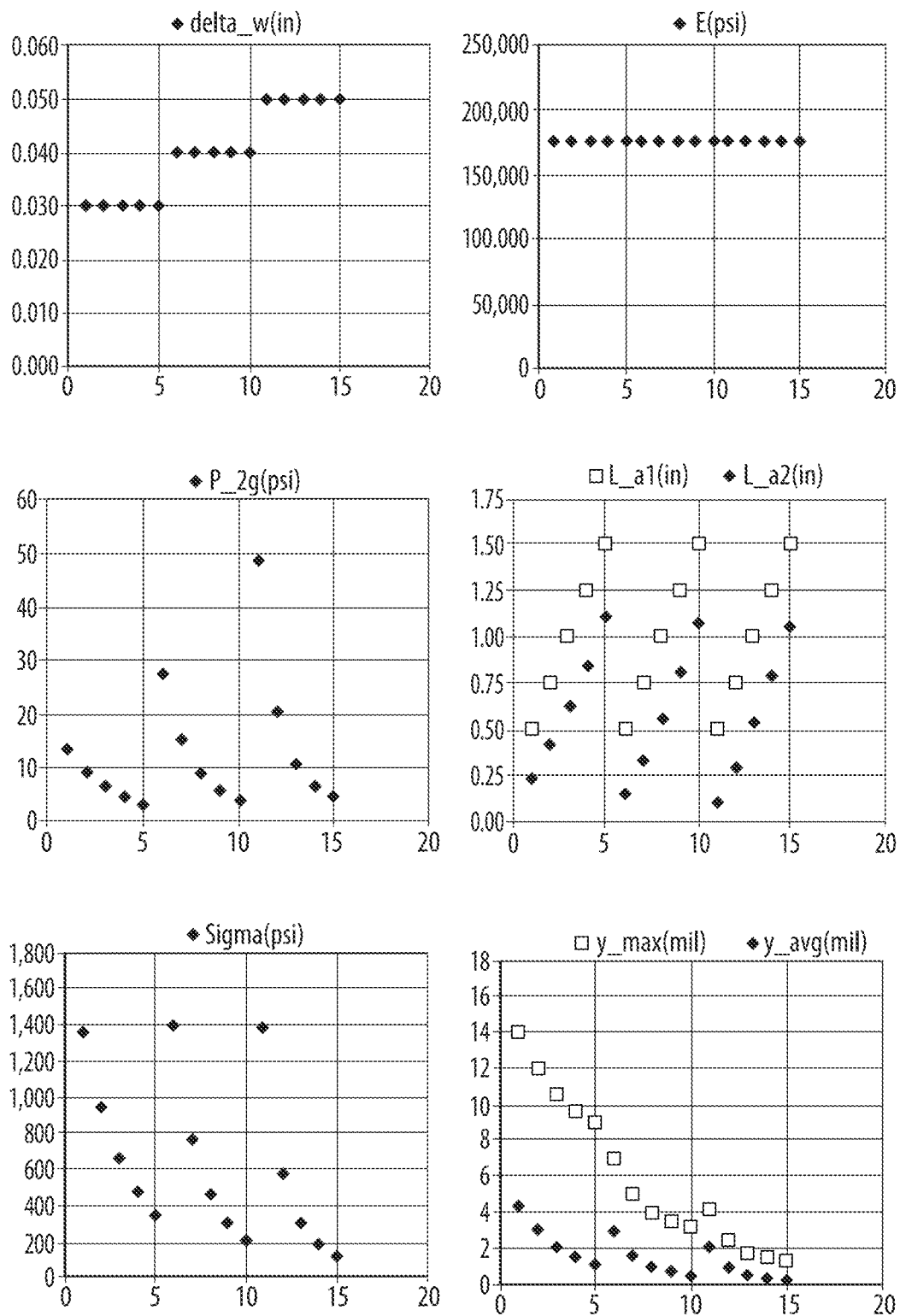
FIG. 7 shows the structural results, using a DOE method.

Structural Considerations:

FIG. 7 shows the structural results, using a DOE method. DOE inputs are elastic modulus, wall thickness, and initial air length. DOE outputs include the final gauge pressure, the final air length, the max wall stress, the average wall deflection, and the max wall deflection. Constant model inputs include a coffee gap of 0.090 in, a tube length of 6 in, an initial air temperature of 70 F, an initial pressure of 14.7 psi, and a final air temperature of 32 F. As the wall is thickened, the deflection and stress decrease. The average deflections are all small relative to the coffee gap, but the max deflection for the 0.030 in wall case is significant. As the initial air length or free space above the filling in each tube increases, the pressure and stress decrease.

Figure 8:
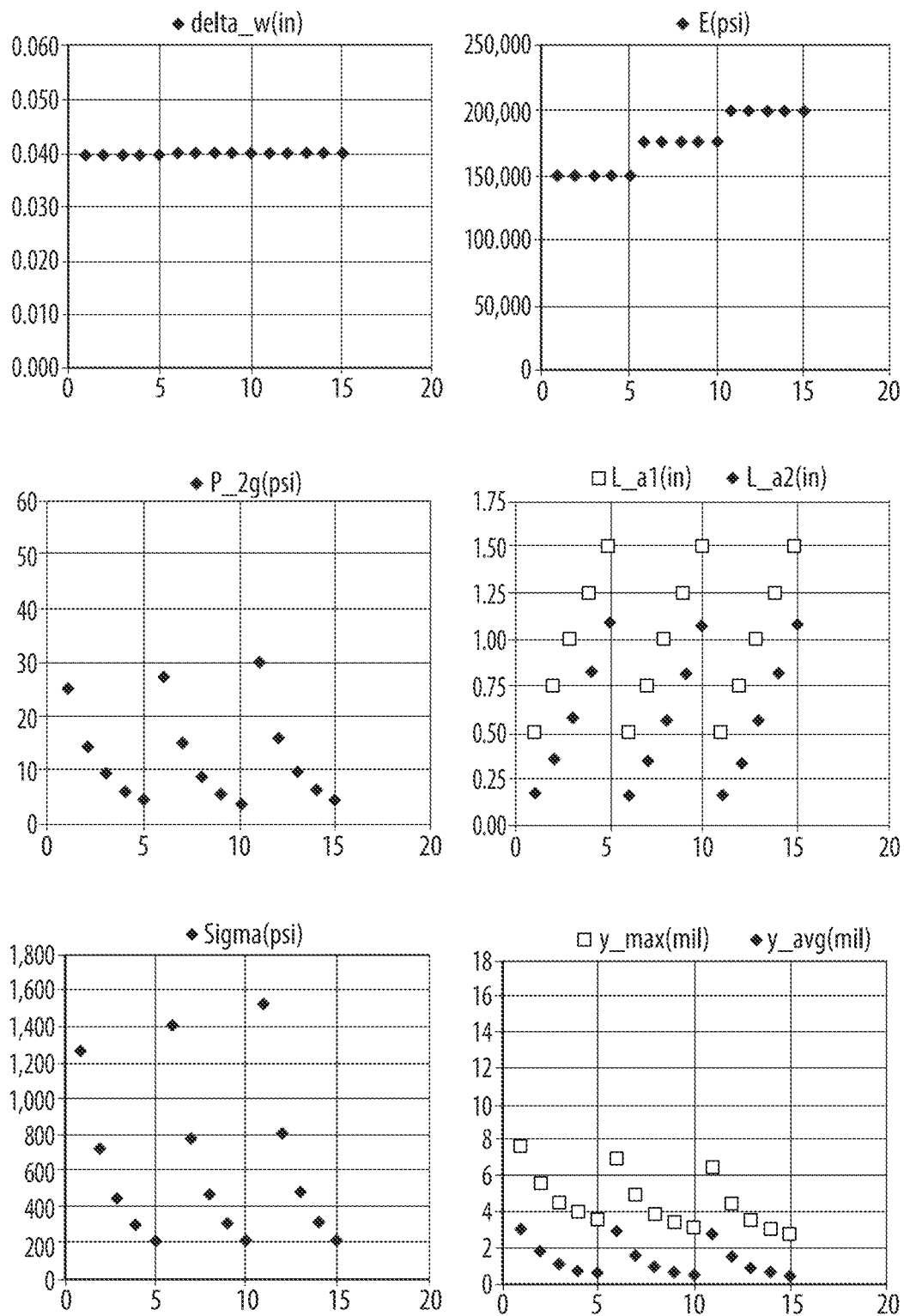
FIG. 8 shows the structural results the wall thickness including elastic modulus sensitivity.

FIG. 8 shows the structural results for a wall thickness of 0.040 in and includes an elastic modulus sensitivity. The stress in the wall increases with stiffness, but the sensitivity is relatively small for the range shown. An initial air length of 1 is chosen to be the design point, with (approximate valves) a gauge pressure of 10 psi, a final length of 0.6 in, a stress of 500 psi, a max deflection of 4 mil, and an average deflection of 1 mil.

Additional Considerations:

Squares tubes were chosen over other shapes such as circles or hexagonal (honeycomb) Tube perimeters shape for practical considerations as well as heat exchanger optimization. Regarding heat exchanger optimization, squares provide uniform coffee gaps between the tubes as well as between the tube and the housing. Regarding practical considerations, squares also provide straight passages through the heat exchanger, which can be used for assembly fixturing, improve cleanability, and presumably also provide a level of consumer comfort in being able to see all the surfaces.

Even though salt may not be required to meet the thermal spec, it is desirable for structural reasons and may be used in some embodiments to increase thermal capacity. Testing has shown that as salt water freezes, the solution is slushy and uniform. This eliminates the chance of an ice bridge forming along the water/air interface that could potentially prevent the ice from expanding into overlying air space, which would increase stress in the wall via liquid/ice pressure.

Considering the 0.5 inch cell selection, several options present strong choices for the housing dimensions. Using 6 inch tall tubes (which would make the housing 6 to 7 inches tall, depending on the stack-up of the end plates) is a reasonable choice relative to other countertop consumer products in general and a French press in particular. A rectangular shape would be similar to a pitcher, but would have the downside of most likely not fitting (at least comfortably) under a single-cup coffee brewer, such as the popular Keurig machines which tend to be adapted for dripping into a circular cup or pitcher opening, and thus requiring a symmetric (square) rather than rectangular profile. Housing dimensions for one embodiment are 5.5 in×3.5 in. If a square cross-sectional housing were used, the pitcher would be less conventional but it would fit better under a Keurig-type brewing appliance.

The top portion of the chiller device preferably includes top and bottom plates which dictate or conform to the layout of the array of cooling tubes. In order to take cleanability into account, it is desirable to incorporate a geometry that prevents coffee from getting into crevices and/or allows coffee to flow freely. Structural details of the top and bottom plates also implicate sealing details of the cooling tubes. The tubes may be sealed individually, or sealed by their connection (such as plastic-welding to the plate(s). In some embodiments tubes may be snapped into the plate(s), however they could be sandwiched between top and bottom plates in a "birdcage" via structural bars. However, plastic welding that positions and simultaneously seals the array of tubes is the currently contemplated design.

In the modeling, the structural DOE used a minimum air length of 0.5 in, to consider points below the yield strength. For reference, if there were no air, then the stress in the wall would be roughly 4,000 (equal to the yield), the pressure would be 80 psi, the average deflection would be 8 mil, and the max deflection would be 15.5 mil. If air were not used, then one inch shorter tubes could be used to maintain a safety margin. Testing did not explore the aggressive option of using no air space during testing, and the discussion herein aims to be conservative.

The actual product lifetime may in the future indicate a need for modifications of materials, dimensions or even manufacturing processes, or for example regarding performance, the cooling can be increased first by increasing the salt concentration, without changing any geometry. Alternatively, either the coffee space, wall thickness or ice space can be changed, e.g., by simple low-cost changes in the tube extrusion tooling. The housing portion experiences only low stress, and its shape and dimensions, beyond the volume, height and array considerations discussed above, as well as materials of construction are straightforward and may be made of any commonly used coffee pot, refrigerator pitcher or other consumer vessel material of suitable thermal and appearance characteristics. Because a flat surface is freer to flex, generally flat walls are preferred, avoiding circular surfaces which are in hoop stress. The air gap buffers the wall stress, and in use, by pouring the hot coffee first into the pitcher, the plastic wall is not exposed an initial heat transfer enhancement via convection (which is beneficial thermally).

High density polyethylene (HPDE) was selected for the tube material, and other materials such as polypropylene (PP) are considered suitable although the lower thermal conductivity of PP may require changes in tube size or array to enhance the overall cooling, i.e., by suitable modifications of dimensions and parameters as described above.

Further, while the above discussion speaks of tubes that aref (partially) filled with a liquid and frozen, the invention also contemplates using a plastic with a thermally conductive filler, that would increase thermal conductivity from 0.3 to 1.0 W/m/K and or would allow greater thermal storage in the tube or rod itself.

Because the tube design described above scales to any volume and aspect ratio, a prototype pitcher embodiment of a beverage chiller is described herein of relatively tall aspect ratio with an active beverage cooling volume of 16 fluid ounces. This tall design allows a smaller footprint, favorably affecting its freezer and counter space requirements. The construction also offers the prospect of application to carbonated beverages. While many earlier devices cannot be used for chilling carbonated beverages because of the rapid release of gas which comes completely out of solution and prevents the full beverage from entering, the present design breathes well and by pouring the beverage into the bottom portion at room temperature first and then lowering the heat exchanger top portion gently into the beverage, the chances of processing carbonation are increased. This ability may need to be confirmed by testing in view of the great number of sodas and carbonated beverages in the marketplace. However, by storing the heat exchanger separately in the freezer, the full heat exchanger is exposed to the cold air, and the cooling time is reduced by a factor of 4 basically as if the injection molded heat exchanger was put in the freezer un-nested. Thus the device construction is well adapted to fast, extreme, cooling as well as other beverage cooling tasks.

Figure 9A:
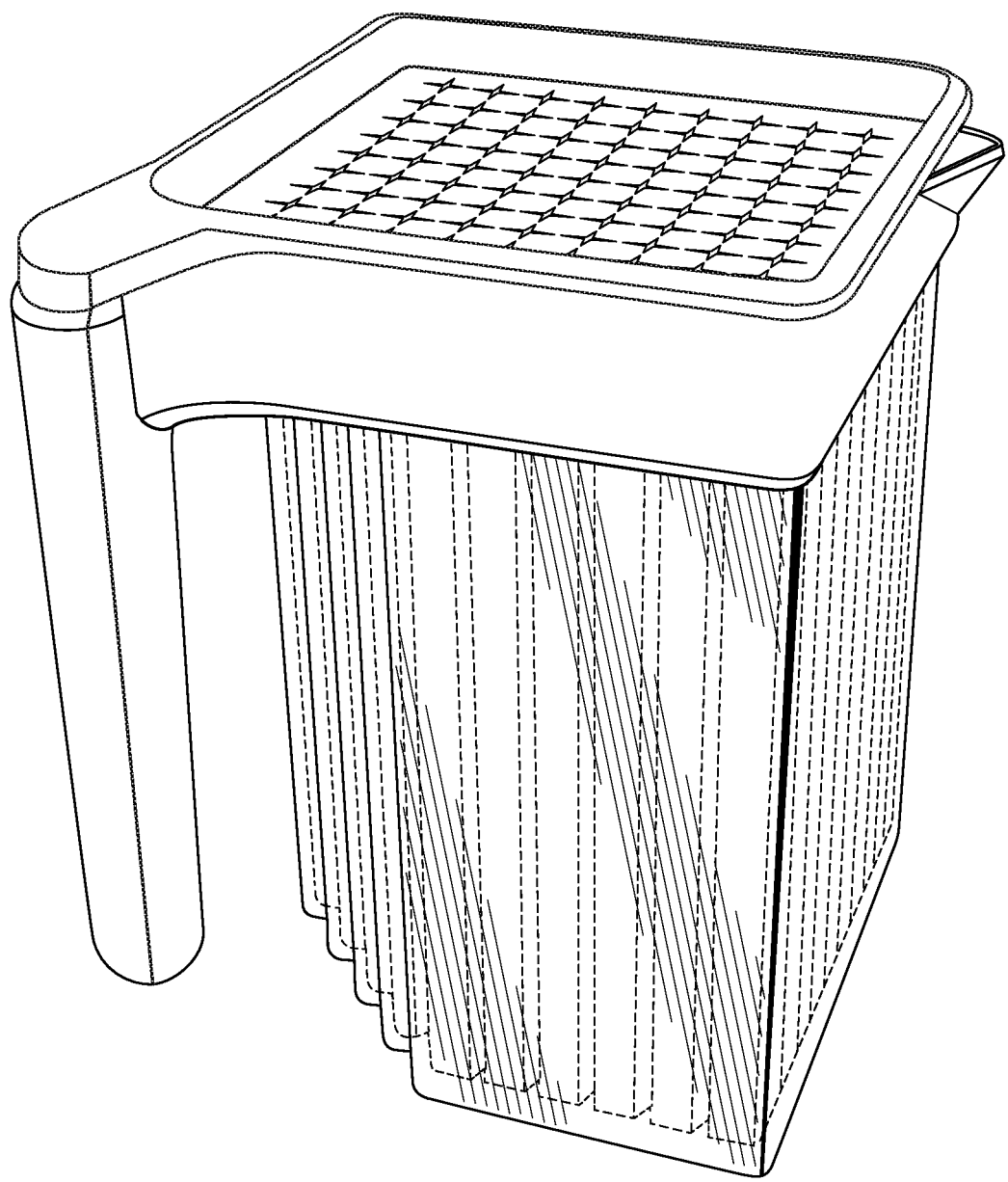
FIG. 9A illustrates a coffee chiller embodiment.

FIG. 9A is a perspective view of a coffee chiller having a pitcher-like lower portion and upper cooling portion formed with a fitted array of thermal cooling tubes extending down into the pitcher. The array and the pitcher each have one stepped edge, and the assembly includes a pour spout, which in various embodiments may be formed in either the lower or the upper portions, and a handle which preferably is part of the structure of the lower portion. The stepped edge aids the user in properly orienting the two portions of the assembly when fitting the top into the bottom vessel, and provides clearance for holding the handle.

Figure 9B:
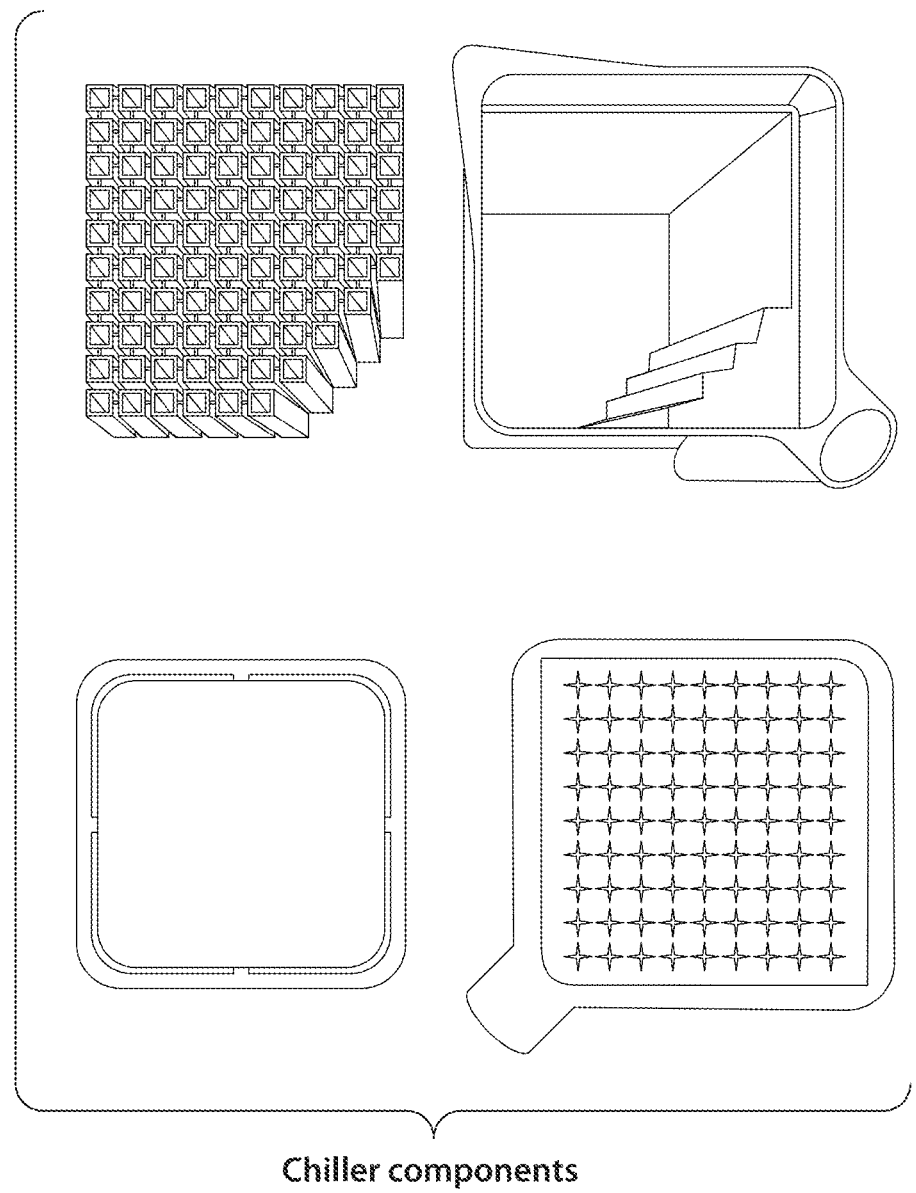
FIG. 9B illustrates prototype components, namely a pitcher, tube array, drip disperser and cover, for the embodiment of FIG. 9A.

FIG. 9B illustrates the several components that are assembled in the embodiment of FIG. 9A. These include, in addition to the pitcher and a tube array, one or more top plates to which the tubes are to be attached, and which are further configured to allow coffee to be poured in, and gases to travel along the fluid passages below and be released without disrupting the filling operation. The top plates, shown in the lower portion of FIG. 9B illustrate two different configurations, shown respectively as a dark plate, and a light plate, of which only one would be used. The dark plate (illustrated as square, but more generally sized to cover and close the tops of a tube array) has a slightly-domed surface and has raised edges that channel fluid down to the edges, where elongated slots extend and channel the beverage poured or dripped thereon, such that it passes through the slots into the pitcher. By acting as a beverage-dispersing plate it assures that fluid can quickly and effectively enter the chiller assembly, and that any air displaced by the entering fluid or diverted by any transient ice-bridging within the assembly, will effectively escape from the assembled vessel without blocking inflow of the coffee or other beverage. The second top plate, shown in white, illustrates another drip plate configuration, wherein small cross-shaped openings form a 9×9 array of apertures allow the beverage to be uniformly dispersed and drip into the inter-tube fluid spaces between the tubes of a 10×10 tube array. It will be appreciated that this fill-dispersion plate, in conjunction with the tube spacing analytics described above, allows clean, fast, spill-free filling into and pouring out from the assembled chiller. This is because in the tube design as described above, coffee is allowed to flow between all the tubes and separate provision for venting is not needed.

Thus, briefly, the tube design has the following advantages over injection molded or other configurations with different structural or molded interior shaped elements:
    Taller and thinner aspect ratio
    Increased coffee volume
    Dry/clean hand interface
    Reduced refreeze time Increased chance of being dishwasher safe
No core or dimensional shift issues
Low tooling cost
Low part cost
Low risk of leak
Low stress in plastic
No venting required
No ice bridging The invention as described above is designed chill hot beverages, such as coffee and tea, and may also, subject to any needed modifications, cool 'cold' beverages, such as soda, beer, wine, etc. In order to accommodate the nominal serving sizes of such a range of beverages, the volume capacity may encompass a fixed design volume such as 16 fluid ounces. However, in order to cool both extremes, since room temperature beverages subjected to the dense array of closely-spaced tube of an ice coffee embodiment would be cooled very rapidly down to iced-cold in 30 seconds, the tube heat exchanger array for certain beverages may be of different configuration, involving fewer, smaller or more-widely-spaced tubes, entailing a different rate of cooling to a different end-temperature. Thus, while for most beverages, colder is better, wine is an exception.

An appropriate serving temperature for red wine is roughly 60° F. and for white wine is roughly 45° F., with a 2 to 3° F. variation depending on type. If the wine has not been sitting in a vault, but is nominally starting at a room temperature of about 68° F., this involves a lesser cooling drop (than hot coffee) and a possibly greater volume of the beverage.

For these different beverages, applicant contemplates somewhat different heat exchange tube arrays, characterized by fewer and/or more widely spaced tubes, that are configured to lower the temperature of the beverage more gradually (allowing a user to 'time' a wine-cooling cycle for, e.g. 30 seconds before decanting), or to lower the temperature to a specific thermal endpoint suited to wine (allowing the wine to remain in the receiving vessel at the proper temperature for an extended time for serving at the table. Other practical implementations may also include having an extra-fully frozen insert of the coffee- or of the wine-tube array for back-to-back runs. When using an array of fewer tubes, the top portion may be sized to fit the same bottom portion, but cool a greater fluid volume.

Figure 10A:
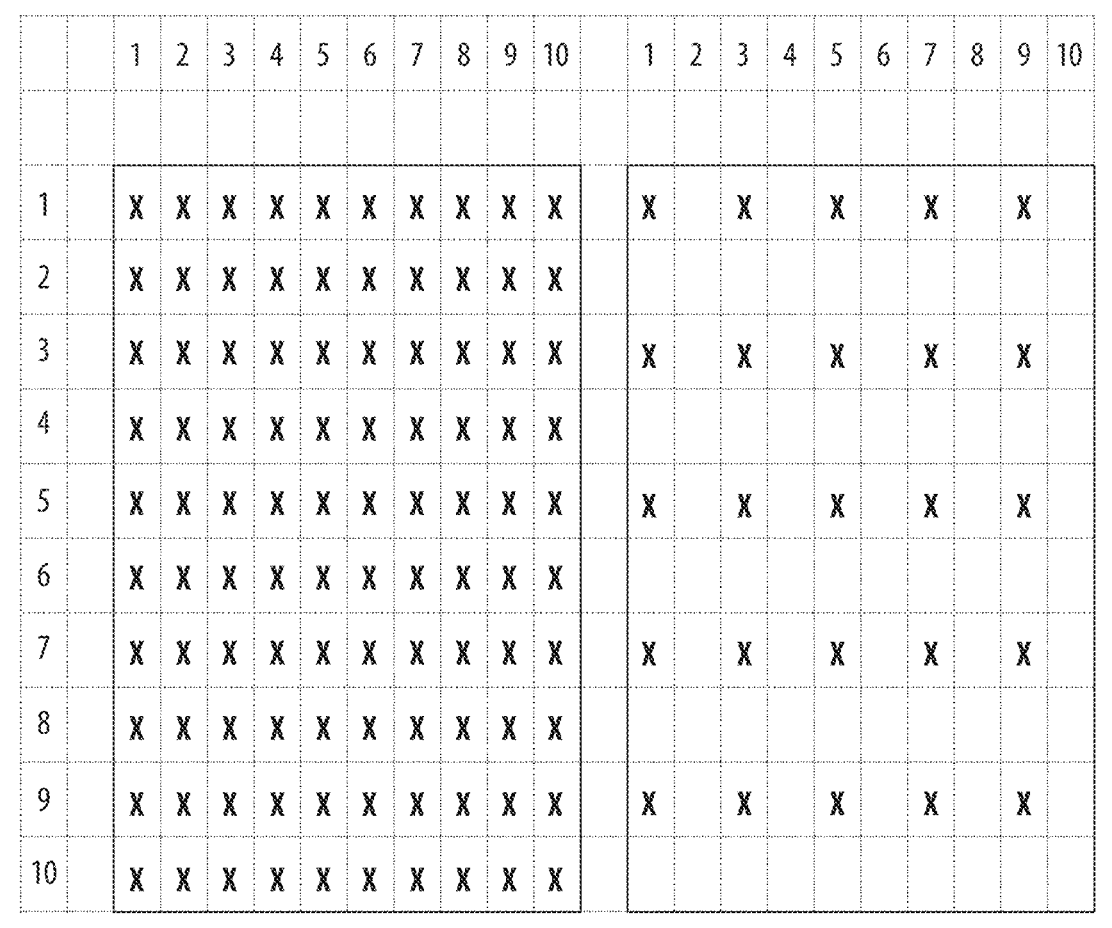

In order to achieve an effective wine cooler assembly, several calculations were performed modelling array behavior to verify feasibility and quantify the performance of such tube heat exchange arrays. FIG. 10A shows a spreadsheet representation of the heat exchanger cross section, based on the square extruded tube design as discussed extensively above. Each "x" represents an extrusion tube, with a representative ice coffee chiller configuration, shown on the left, approximated as a perfect 10×10 square for analysis. One proposed sparse cooler configuration is shown on the right, in which every other tube is removed, reducing the tube count to a 5×5 or 25 tube array in the same space. A simulation was used to calculate the temperature response of the proposed heat exchanger. The reference full heat exchanger geometry was: 0.280" cold (ice core) gap, 0.030" wall thickness, and 0.080" hot (fluid space) gap. The modified geometry obtained by removing every other tube resulted in: 0.280" cold gap, 0.030" wall, 0.500" hot (fluid space) gap.

Figure 10B:
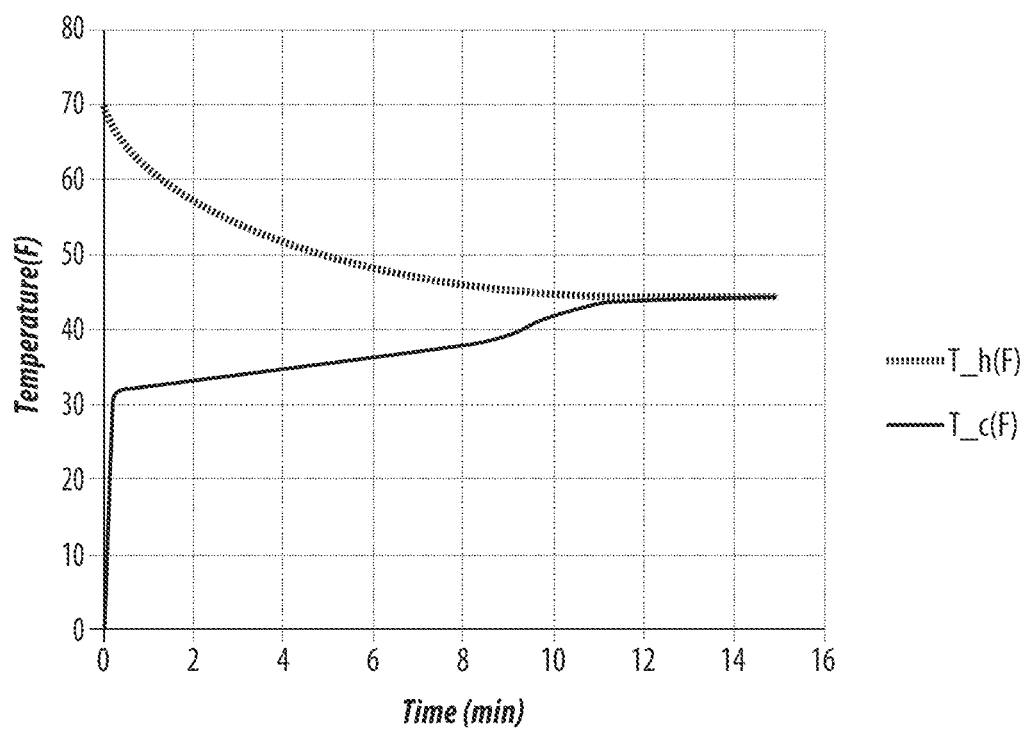

FIG. 10B shows the space averaged temperature response on the wine, and on the ice/melt within the tubes. Cooling is relatively slow, with the wine temperature crossing the 50° F. line at 5 minutes and leveling off at around 45° F. after roughly 10 minutes. The ice/melt transitions from freezer temperature, to melting, to fully melted. As the beverage and the ice/melt temperatures approach each, the system reaches steady-state.

Figure 10C:
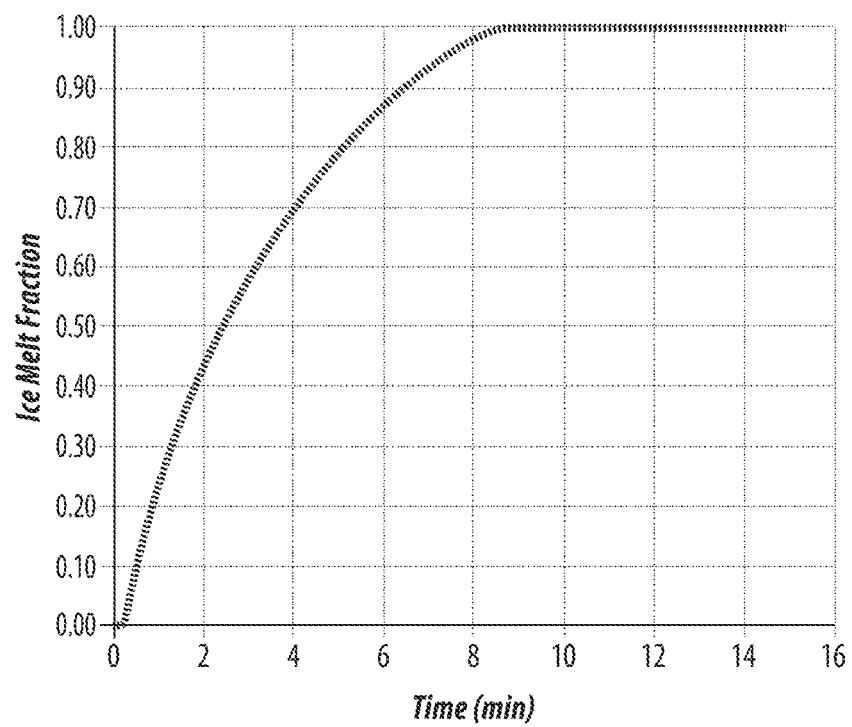

FIG. 10C shows the ice melt fraction response. The ice is fully melted slightly after 8 minutes. Cooling capacity is fully exhausted, so that as a practical matter, the wine can be left in the pitcher.

FIG. 10D shows a Table summarizing the geometry details of the embodiments described above, with dimensional characteristics of the coffee configuration in the top block of data, and those of the wine configuration in the bottom. By reducing the tube count from 100 to 25, the beverage volume is increased from 16 oz to 38.8 oz or 1,175 mL. The axial length here does not include the air section of the tubes.

The foregoing description thus demonstrates the flexibility of the tube chiller architecture, and useful performance in a beverage chiller that is configured as a passive pitcher assembly which operates to chill wine to a serving temperature, and maintain that temperature in the serving vessel.

As described above, then, the present invention provides a vessel assembly formed of a tube based thermal cooling portion, and a vessel-like cup or pitcher portion that interfit to receive a beverage and chill the beverage to a specified serving temperature. The tube heat exchangers are adapted to quickly convert hot coffee to iced coffee, or to chill wine to a proper wine-serving temperature.

The invention being thus described in detail for these examples, it will be apparent from the foregoing description that dimensions of the thermal cooling tubes as well as the tube arrays and vessel portions may be set to achieve the desired cooling of carbonated beverages or other drinks based on the serving size and properties of the specific beverages, such as sodas, beers or cocktail preparations. Such beverage-specific variations, and further embodiments will occur to those skilled in the art, and all such variations and modifications are encompassed within the invention as defined by the claims appended hereto.

The invention claimed is:

1. A beverage chiller, comprising:
a bottom portion including a perimeter wall defining a receiving vessel for receiving a beverage to be chilled; and
a top portion including an array of cooling tubes that includes at least first and second cooling tubes, the bottom and top portions interfitting such that the cooling tubes extend vertically down into the beverage and chill the beverage to a desired temperature by thermal contact with said cooling tubes when the top portion is positioned on the bottom portion, wherein:
each of the cooling tubes in the array occupies a respective first area within a horizontal cross-section of a lower region of the receiving vessel when the top portion is positioned on the bottom portion, the perimeter wall defining a second area within the horizontal cross-section,
the respective first areas together occupy a majority of the second area,
the first and second cooling tubes have first and second generally flat surfaces arranged such that the first generally flat surface faces and is substantially parallel to the second generally flat surface, and
a distance between the first and second generally flat surfaces is less than or equal to one tenth of one inch.

2. The beverage chiller of claim 1, wherein the first and second cooling tubes are extruded tubes which contain a freezable or phase change thermal storage medium.

3. The beverage chiller of claim 1, wherein the first and second cooling tubes are extruded tubes having outer cross dimension under one half inch.

4. The beverage chiller of claim 1, wherein the top portion forms a lid for the bottom portion, and the beverage chiller constitutes a pitcher configured to decant beverage cooled therein into a cup or glass.

5. The beverage chiller of claim 4, wherein the lid is configured to channel, distribute or trickle hot coffee that is poured onto the lid onto and between the first and second cooling tubes therebelow to efficiently receive and cool the coffee without icing or backing up.

6. The beverage chiller of claim 1, wherein the first and second cooling tubes are spaced and positioned with respect to other cooling tubes to cool a coffee space or fluid volume equal to one cup, one serving, or a brew volume of a domestic coffee brewing machine.

7. The beverage chiller of claim 1, wherein the first and second cooling tubes are dimensioned and arrayed with other cooling tubes to have a thermal capacity effective to chill two or more cups of hot coffee in succession to iced coffee.

8. The beverage chiller of claim 1, wherein the first cooling tube is non-concentric with the second cooling tube.

9. The beverage chiller of claim 1, wherein the distance between the first and second generally flat surfaces is greater than six one hundredths of one inch.

10. The beverage chiller of claim 1, wherein:
the first and second cooling tubes have first and second perimeters, respectively, within the horizontal cross-section of the lower region of the receiving vessel; and
the first and second perimeters have substantially a same size and shape.

11. The beverage chiller of claim 10, wherein the first cooling tube is disposed outside the second perimeter, and the second cooling tube is disposed outside the first perimeter.

12. The beverage chiller of claim 10, wherein a first center point defined by the first perimeter is different than a second center point defined by the second perimeter.

13. The beverage chiller of claim 1, wherein an exterior cross-dimension of the first cooling tube within the horizontal cross-section is less than 0.4 inches.

14. The beverage chiller of claim 13, wherein a wall thickness of the first cooling tube within the horizontal cross-section is between 0.02 and 0.04 inches.

15. The beverage chiller of claim 1, wherein the array comprises at least four cooling tubes.

16. The beverage chiller of claim 1, wherein the array comprises at least nine cooling tubes.

17. The beverage chiller of claim 1, wherein the array comprises at least twenty five cooling tubes.

18. The beverage chiller of claim 1, wherein the array comprises at least thirty six cooling tubes.

19. The beverage chiller of claim 1, wherein the respective first areas together occupy at least sixty percent of the second area.

20. A method of preparing iced coffee, comprising the steps of:
brewing hot coffee; and
placing the hot coffee in the beverage chiller of claim 1 to convert it into iced coffee.

* * * * *